E. CURTIS.
NOISELESS PAWL.
No. 177,811. Patented May 23, 1876.
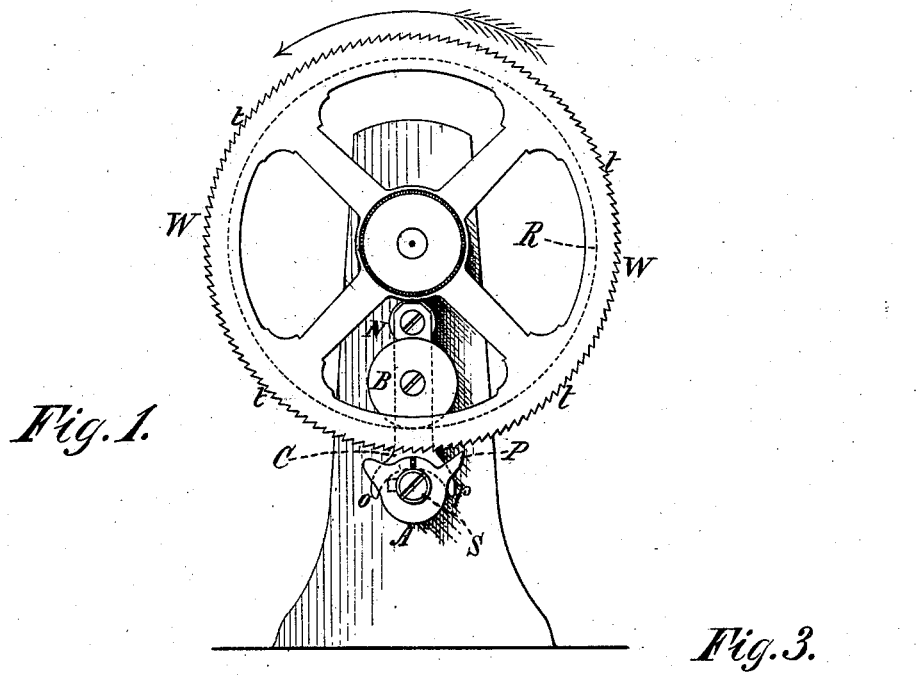
Fig. 1.
Fig. 3.
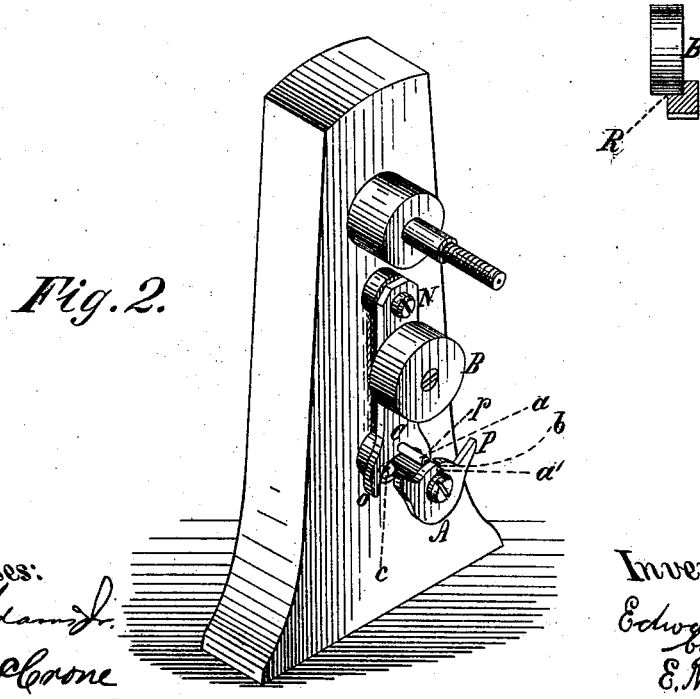
Fig. 2.
Witnesses:
Isaac Adams Jr.
John M. Crone
Inventor:
Edward Curtis
by his Atty
E. N. Dickerson Jr.

UNITED STATES PATENT OFFICE.

EDWARD CURTIS, OF NEW YORK, N. Y.

IMPROVEMENT IN NOISELESS PAWLS.

Specification forming part of Letters Patent No. 177,811, dated May 23, 1876; application filed April 13, 1876.

*To all whom it may concern:*

Be it known that I, EDWARD CURTIS, of New York, and State of New York, have invented a new and useful Improvement in Noiseless Pawls, which improvement is fully set forth in the following specification, reference being had to the accompanying drawings.

My invention relates to an improvement in noiseless pawls. It is important in many of the machines and contrivances now in general use, notably in sewing-machines, that they be capable of motion or revolution only in one direction—a revolution in the opposite direction greatly disarranging their mechanism, and perhaps destroying the machine. In order to prevent the backward motion of such machines it is customary to employ what is known as a pawl and ratchet, or sometimes what is known as a friction-dog. A friction-dog is uncertain in its operation, and will not serve for machines in which considerable force is exerted. The ordinary form of pawl and ratchet is liable to the objection that the pawl, passing over the teeth of the ratchet, makes a scraping or rattling noise, and, in addition, requires considerable force to operate it. So important is the first objection that, in sewing-machines, the motion of which it is particularly important should be only in one direction, no apparatus of any sort is usually employed to prevent reverse movement.

The purpose of my invention is to form a pawl which will certainly engage in the teeth of the ratchet, but will be held free from them while the wheel is pursuing its ordinary direction.

The principle of my invention is so to arrange the pawl that, while it naturally tends to engage with the teeth of the ratchet, it will be held free and clear from these teeth by means of the friction exerted by the revolving wheel against some intermediate contrivance. While it is naturally balanced, or nearly so, on its own pivot, the friction exerted by the revolving main wheel against some intermediate contrivance, shall determine the throwing of the pawl out of gear, and the holding of it free when the wheel turns in its proper direction, and the immediate throwing of the pawl into gear when the motion is reversed. A slight want of exact balance of the pawl-piece would cause gravity to keep moving the pawl in one direction, and oppose its motion in the other, and this force may be utilized in determining the more certain movement of the pawl in one of the directions, while, if it be not greater than the force of the friction contrivance above described, it at the same time will not prevent the determining of the necessary movement of the pawl in the reverse direction.

One form of my invention is clearly shown in the accompanying drawings.

Figure 1 represents a general view of my apparatus; Fig. 2, a detailed drawing of some of the parts; Fig. 3, a cross-section of the friction-wheel and main wheel, showing their mutual engagements.

Fig. 1 represents the wheel W, perhaps the main wheel of a sewing-machine, or a wheel attached to the same shaft, having upon its circumference a number of ratchets or teeth, *t*. This wheel properly revolves in the direction indicated by the arrow.

The object of this invention is to prevent its movement in the reverse direction. This is accomplished by means of the engaging-pawl P. This pawl is preferably a balanced one—that is to say, one in which the center of rotation is the center of gravity. If this pawl be vibrated around its center S, in the same direction as that in which the main wheel is turning, it is obvious that its tooth P will be brought into contact with the teeth *t* of the main wheel. This vibration is effected by means of the lever C hanging like a pendulum from the center N and carrying the wheel B. This wheel B runs in a groove or channel in the wheel W, as represented in Fig. 3, where R shows the point of engagement. The wheel B therefore revolves with the large wheel W, and the friction around its center point is sufficient to swing the pendulum, to which it is attached, in the same direction as the large wheel, so that it is usually swung to the right; but if the wheel W be reversed it will swing to the left. The swing of this pendulum is limited by means of two arms, *o* and *p*, which embrace the central pivot of the pawl P, as shown in this contrivance. The range of swing of C is further regulated by means of the set-screw *c*, which is so adjusted as to control the movement of C toward the right, while the engagement of the pawl P, with the teeth t, prevents its too great movement to the left. The movement of the pendulum C is communicated to the pawl by means of the pin A at right angles to the pendulum, which engages in the slot $a'$. It is now evident that the movement of the wheel B to the right will throw down the pawl P, while its movement to the left will raise this pawl, and cause it to engage with the teeth t. This movement is caused by friction in this apparatus by the friction of the wheel B; but I would not be understood as limiting myself to this particular form of construction. The slot at the upper end of the pendulum C, by which the latter hangs upon the pivot N, is slightly elliptical perpendicularly, so as to allow the continued engagement of the wheel B with the wheel W when it is swung from its perpendicular position. This would be unnecessary if the pivot N was upon the same shaft as the main wheel W.

It is very evident that the relative movement of the wheel B and pawl P is regulated by the length of the intermediate levers.

The principal advantages of my apparatus are these: In the first place the entire absence of noise or jar of any sort; and, in the second place, the fact that only so much force is used as to throw the pawl in and out of gear.

I claim—

1. A noiseless pawl, thrown out of gear and kept entirely free from contact with the teeth of the ratchet by friction with the main wheel, as it revolves in one direction, and thrown into gear by means of friction against the main wheel as soon as the main wheel moves in the opposite direction, the said pawl being controlled by intermediate levers, substantially as and for the purposes described.

2. A friction-wheel, B, used to control a pawl, the said friction-wheel being mounted upon a radius and pivot, and having an elliptical socket, so as to be kept continually engaged with the main wheel, substantially as described.

3. A pawl, P, whose center of gravity corresponds with its center of rotation, so as to be easily moved around its center, and to be controlled by friction against the main wheel, substantially as described.

4. The use of a pendulum to control the movement of a pawl, substantially as described.

5. The use of a pendulum to control a pawl limited in its action by the stops $o$ and $p$, substantially as described.

EDWARD CURTIS.

Witnesses:
ISAAC ADAMS, Jr.,
W. J. SAWYER.